US007809186B2

(12) United States Patent
Takahashi

(10) Patent No.: US 7,809,186 B2
(45) Date of Patent: Oct. 5, 2010

(54) IMAGE PROCESSING APPARATUS, IMAGE PROCESSING METHOD, PROGRAM THEREOF, AND RECORDING MEDIUM

(75) Inventor: Fumiaki Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 913 days.

(21) Appl. No.: 11/111,910

(22) Filed: Apr. 22, 2005

(65) Prior Publication Data

US 2005/0238227 A1   Oct. 27, 2005

(30) Foreign Application Priority Data

Apr. 27, 2004   (JP)   ............................ 2004-131572

(51) Int. Cl.
*G06K 9/00*   (2006.01)
(52) U.S. Cl. .................................... 382/162
(58) Field of Classification Search ................ 345/557; 382/167, 307, 309, 162; 348/609, 631; 386/44
See application file for complete search history.

(56) References Cited

U.S. PATENT DOCUMENTS

| 5,204,665 | A * | 4/1993 | Bollman et al. ............. 345/605 |
| 6,934,414 | B2 * | 8/2005 | Kondo et al. ................ 382/199 |
| 7,035,462 | B2 * | 4/2006 | White et al. ................ 382/167 |
| 2002/0194299 | A1 * | 12/2002 | Yasaki et al. ................ 709/217 |

FOREIGN PATENT DOCUMENTS

| JP | 07-271958 | 10/1995 |
| JP | 8-258344 | 10/1996 |
| JP | 10-334225 | 12/1998 |
| JP | 2000-078620 | 3/2000 |
| JP | 2001-045500 | 2/2001 |
| JP | 2003-333617 | 11/2003 |
| JP | 2004-080099 | 3/2004 |
| JP | 2004-80549 | 3/2004 |

OTHER PUBLICATIONS

Office Action dated Mar. 23, 2010 in JP 2005-127959.
Office Action dated Jun. 29, 2010 in JP 2005-127959.

* cited by examiner

*Primary Examiner*—Matthew C Bella
*Assistant Examiner*—Dennis Rosario
(74) *Attorney, Agent, or Firm*—Fitzpatrick, Cella, Harper & Scinto

(57) ABSTRACT

Provided herein is an image processing apparatus comprising: input means for inputting image data, which is obtained by digitalizing an image signal that has been converted from light from an object to an electric signal by an image sensor, and performing no compression or lossless compression; image processing parameter input means for inputting a parameter to be employed in image processing on the image data executed by a user; image processing means for performing luminance-related processing or chrominance-related processing on the image data in accordance with the image processing parameter inputted by the image processing parameter input means; and storage means for storing an intermediate result for each of the luminance-related processing and the chrominance-related processing. By virtue of storing the intermediate results, this invention contributes not only to high-speed RAW image data development processing, but also to a reduced image processing load and increased processing speed.

8 Claims, 11 Drawing Sheets

FIG. 5
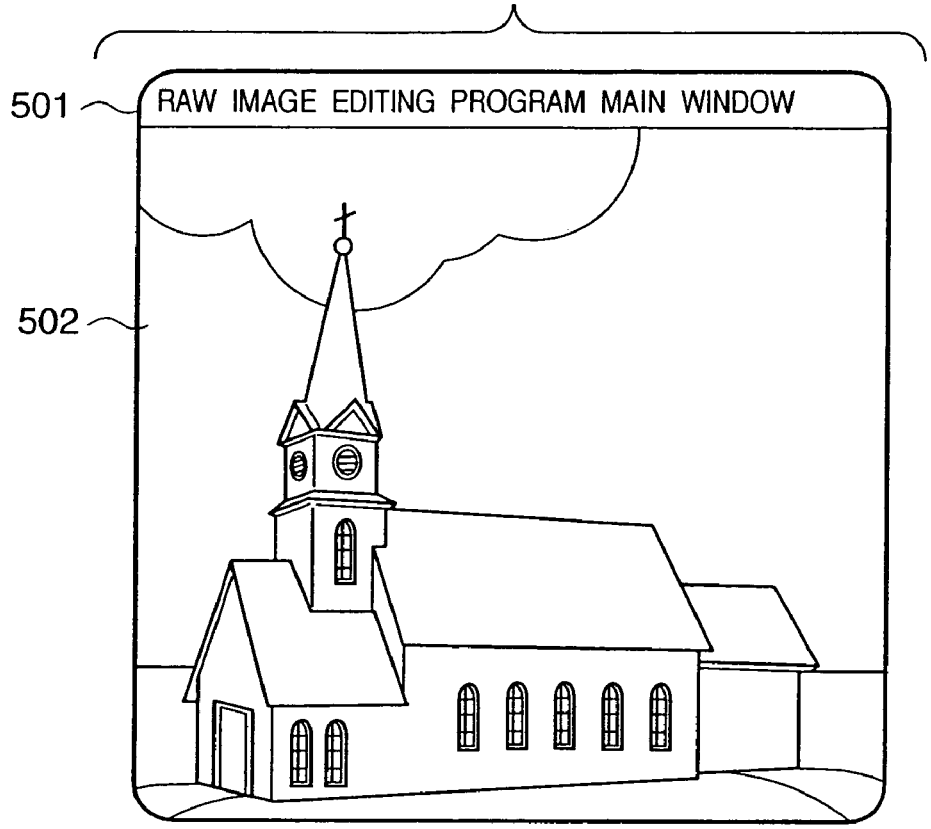
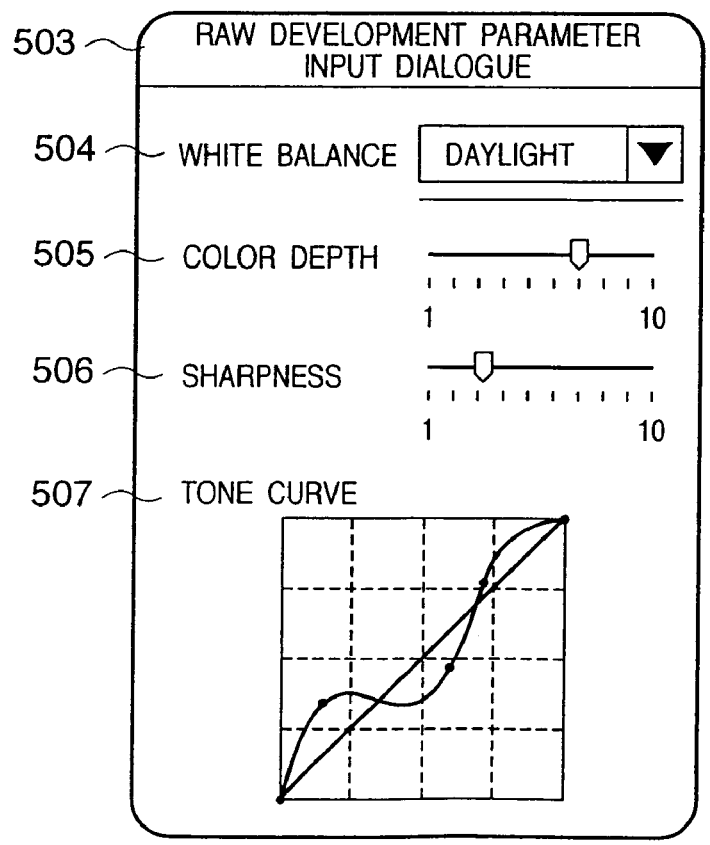

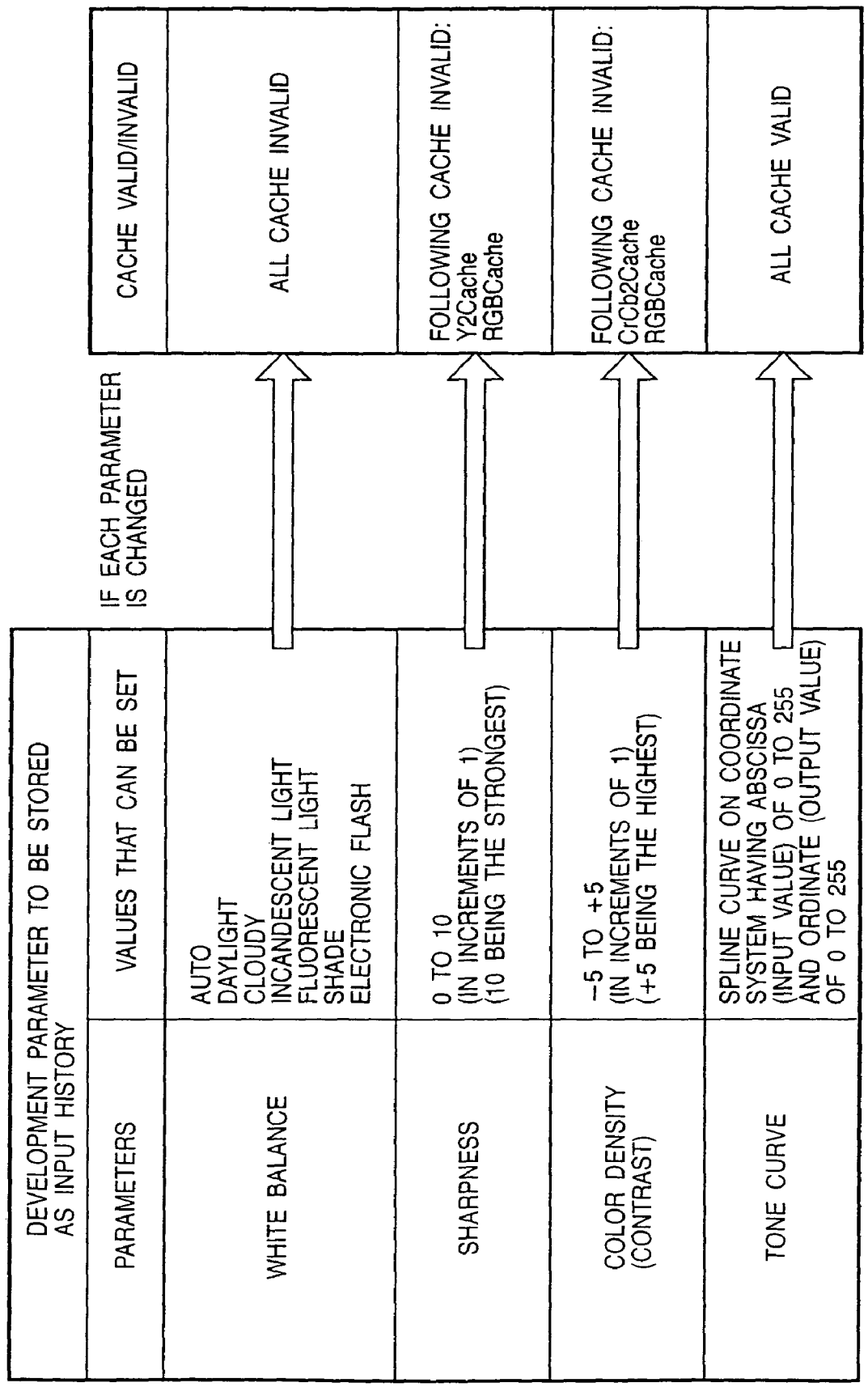

IMAGE PROCESSING APPARATUS, IMAGE PROCESSING METHOD, PROGRAM THEREOF, AND RECORDING MEDIUM

FIELD OF THE INVENTION

The present invention pertains to image processing (image editing) performed on digital image data, in particular, image data generated by an image input device such as a digital camera, and more particularly, to a technique of reducing the processing load involved in performing such image processing.

BACKGROUND OF THE INVENTION

Currently it is common to view or edit images, which are sensed by a digital camera, by employing application software installed in a personal computer (PC).

Some digital cameras have a function for storing a sensed image as raw data (data that has been subjected to photoelectric conversion by an image sensor such as a CCD or a CMOS, then subjected to A/D conversion and lossless compression at the time of image sensing by a digital camera, thus keeping the sensed information intact). Hereinafter, an image stored as raw data will be referred to as a raw image.

Further, some image processing software is capable of image processing (hereinafter referred to as raw image development processing) based on image processing parameters (hereinafter referred to as development parameters), e.g., attribute information recorded in association with the raw image, characteristics of the digital camera main unit, as well as resolution, sharpness, hue, and white balance set by a user.

Employing such image processing software enables a user to obtain an image of which the quality meets the user's preferences with its parameters adjusted. Note that since image data that has been developed is generally stored in a versatile data type (JPEG, BMP, TIFF or the like), processing including storage may be referred to as development processing.

For instance, according to the disclosure of Japanese Patent Application Laid-Open (kokai) No. 2004-080099, development processing is performed on raw image data by applying development parameters, e.g., white balance adjustment, color-effect mode selection, contrast adjustment, color-density adjustment, sharpness adjustment and so on set by a user, and the developed result is displayed on a display device and stored in a versatile file such as JPEG.

However, in raw image development processing, the outcome of image development using the inputted development parameters is unknown until the user sees the actual result of development. Therefore, it is difficult to achieve a satisfactory processing result without inputting parameters two or more times. Normally, a user repeats parameter input by trial and error, while confirming the developed result on the display device, to determine satisfactory parameter values.

Since each processing that constitutes development processing applying the user-input development parameters is performed on all pixels of raw image data (in principle, their number is the number of effective pixels of the image sensor), the processing load involved in the development processing is very heavy or high. If development is performed each time the parameter value is changed in the process of trial and error to decide the development parameter values, an extremely long processing time is required.

Furthermore, along with the trend toward higher resolution of a digital camera in recent years, the processing load has tended to become heavy. In addition, due to users' rising interest in higher image quality, image processing on raw image data is growing popular.

SUMMARY OF THE INVENTION

The object of the present invention is to solve the above-described problems of the conventional art, and to meet users' needs for image processing that has become complicated because of the trend toward ever higher-quality image processing on sensed images, as well as to reduce the calculation load involved in the image processing.

According to the present invention, the foregoing object is attained by providing an image processing apparatus comprising:

input means for inputting image data, which is obtained by digitalizing an image signal that has been converted from light from an object to an electric signal by an image sensor, and performing no compression or lossless compression;

image processing parameter input means for inputting a parameter to be employed in image processing on the image data executed by a user;

image processing means for performing luminance-related processing or chrominance-related processing on the image data in accordance with the image processing parameter inputted by the image processing parameter input means; and storage means for storing an intermediate result for each of the luminance-related processing and the chrominance-related processing.

According to another aspect of the present invention, the foregoing object is attained by providing an image processing apparatus comprising:

input means for inputting image data that is obtained by converting light from an object to an electric signal employing an image sensor, digitalizing an image signal, and performing no compression or lossless compression;

image processing parameter input means for inputting a parameter to be employed in image processing on the image data executed by a user;

image processing means for performing image processing on the image data in accordance with the image processing parameter inputted by the parameter input means;

storage means for storing a result of image processing and an intermediate result of image processing;

cache control means for caching the intermediate result of image processing in the storage means in preparation for next image processing;

image processing parameter input history storage means for storing input history information of a parameter inputted by the image processing parameter input means; and cache control means for controlling whether or not to cache the intermediate result of image processing in the storage means in accordance with a comparison between a current image processing parameter and previous input history information stored in the image processing parameter input history storage means.

In still another aspect of the present invention, the foregoing object is attained by providing an image processing method comprising:

an input step of inputting image data, which is obtained by digitalizing an image signal that has been converted from light from an object to an electric signal by an image sensor, and performing no compression or lossless compression;

an image processing parameter input step of inputting a parameter to be employed in image processing on the image data executed by a user;

an image processing step of performing luminance-related processing or chrominance-related processing on the image data in accordance with the image processing parameter inputted in the image processing parameter input step; and a storage step of storing an intermediate result for each of the luminance-related processing and the chrominance-related processing.

In still another aspect of the present invention, the foregoing object is attained by providing an image processing method comprising:

an input step of inputting image data, which is obtained by digitalizing an image signal that has been converted from light from an object to an electric signal by an image sensor, and performing no compression or lossless compression;

an image processing parameter input step of inputting a parameter to be employed in image processing on the image data executed by a user;

an image processing step of performing image processing on the image data in accordance with the image processing parameter inputted in the parameter input step;

a storage step of storing a result of image processing and an intermediate result of image processing;

a cache control step of caching the intermediate result of image processing in a storage unit in preparation for next image processing;

an image processing parameter input history storage step of storing input history information of a parameter inputted in the image processing parameter input step; and a cache control step of determining whether or not to cache the intermediate result of image processing in accordance with a comparison between a current image processing parameter and previous input history information stored in the image processing parameter input history storage step.

According to the present invention, it is possible to reduce time required for development processing and to display the processing result at high speed, thereby improving usability in development of a RAW image in accordance with user's preference.

Furthermore, in RAW image data development processing, it is possible to increase the developing speed, and further to reduce the necessary memory capacity by efficiently using the memory.

Other objects and advantages besides those discussed above will be apparent to those skilled in the art from the description of the preferred embodiments of the invention which follows. In that description, reference is made to the accompanying drawings, which form a part thereof, and which illustrate examples of the various embodiments of the invention. Such examples, however, are not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a view showing an example of a user interface provided by the image processing apparatus according to the present invention;

FIG. 11 is an explanatory view showing an example of development parameter input history data and handling of cache data in the embodiment of the present invention.

DETAILED DESCRIPTION OF THE PREFERRED EMBODIMENTS

The preferred embodiments of the present invention will now be described in detail in accordance with the accompanying drawings.

First Embodiment

Figure 1:
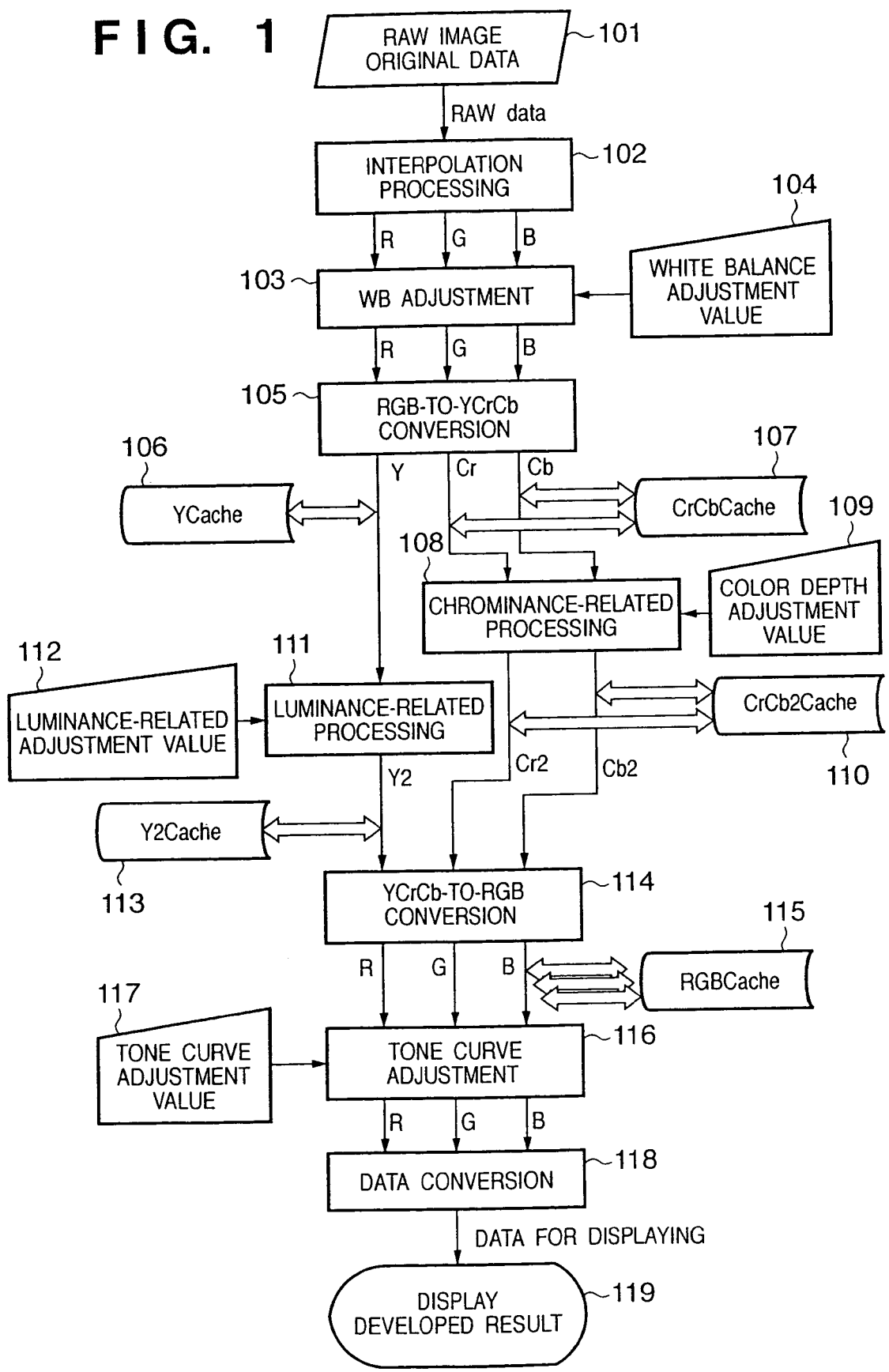
FIG. 1 is an explanatory diagram showing raw image data development processing in an image processing apparatus according to an embodiment of the present invention.

FIG. 1 is a data flow/operation block diagram for describing an example of a raw image data developing procedure in an image processing apparatus according to the first embodiment of the present invention. The image processing apparatus, which performs image processing (developing procedure) on raw image data, is realized by a computer apparatus represented by, e.g., a personal computer or a CPU of a digital camera, executing a control program for performing the processing that will be described below.

Numeral 101 denotes raw image original data. Although as described above there is raw image data that has been subjected to lossless compression, the present embodiment assumes that the raw data has been subjected to no compression. Further, assume that this embodiment employs raw image data that has been sensed with the use of a color filter adopting a Bayer pattern having R, G1, G2, and B.

Numeral 102 denotes interpolation processing for performing interpolation with respect to lost pixels of each component based on the raw image data having the Bayer pattern, and generating R, G and B plane data having (substantially) the same horizontal and vertical sizes as that of the raw image. Note that, in the present embodiment, the average value of G1 and G2 planes is outputted as a G plane.

Numeral 103 denotes white balance (WB) adjustment processing. R, G, and B data are respectively multiplied by a WB coefficient value calculated from processing (not shown) based on a condition set at the time of image sensing or a WB coefficient value that has been calculated based on a user-inputted white balance adjustment value 104 to adjust white balance of the image in such a way that the R, G, and B values in the white portions of the object have equal values (and thus make the portion white).

Numeral 104 denotes a white balance adjustment value serving as one of the image processing parameters (development parameters) inputted by a user through a user interface (not shown). In general, the value is selected from among possible color temperatures of the light source, such as daylight, cloudy, Tungsten light, fluorescent light, and so on.

Numeral 105 denotes color conversion processing for converting WB-adjusted RGB data to YCrCb data. In this operating procedure, RGB data is converted to Y (luminance data) and CrCb color (color difference data) components for color separation, and then respective processing is performed. Each of the color-separated components is later converted back to RGB data.

Note that although the description is provided on YCrCb in the present embodiment, other data forms, e.g., L*a*B* or YUV may be used as long as the data form allows separation into luminance and color data.

Numeral 106 denotes luminance-related cache data YCache. Among the output result of the RGB-to-YCrCb conversion processing 105, the Y component is cached in a memory (not shown).

Numeral 107 denotes chrominance-related cache data CrCbCache. Among the output result of the RGB-to-YCrCb conversion processing 105, the CrCb component is cached in a memory (not shown).

Numeral 108 denotes chrominance-related processing, where color processing is performed on the CrCb component to achieve excellent image quality, and color density adjustment is performed in accordance with a color density adjustment value 109 serving as an image processing parameter arbitrarily inputted by a user. The processing result is outputted as Cr2 and Cb2.

The color density adjustment value 109 is a parameter for performing image processing on RAW image data, inputted by a user through a user interface serving as image processing parameter input means. For the parameter, for instance, ten levels including 1 to 10 are set, 1 being the lowest saturation and 10 being the highest saturation.

Numeral 110 denotes chrominance-related cache data CrCb2Cache. The outputted components Cr2 and Cb2 of the chrominance-related processing 108 are cached in a memory.

Numeral 111 denotes luminance-related processing where gamma correction, noise removal, and aperture control (APC) are performed to make the image suitable for screen display. The processing result is outputted as Y2.

Herein, the APC is specifically described. APC is performed with reference to a sharpness adjustment value serving as a luminance-related adjustment value 112 inputted by a user. In general, humans perceive high image quality when an object's edges are sharp. Therefore, in normal raw development processing, a luminance signal is added in the APC to realize edge enhancement. It should be noted that the more the edge is enhanced, the more conspicuous the noise in the image becomes. Therefore, it is necessary to perform an appropriate level of edge enhancement. The sharpness adjustment value 112 is one of the development (image processing) parameters inputted by a user for performing image processing on raw image data. For the levels of adjustment value, for instance, levels 1 to 10 are set, 10 being the highest enhancement on the edge. An appropriate sharpness adjustment value is determined by trial and error while the user views and confirms the developed result.

Numeral 113 denotes luminance-related cache data Y2Cache. The Y2 component outputted from the luminance-related processing 111 is cached in a memory.

Numeral 114 denotes YCrCb-to-RGB conversion processing, where image data of YCrCb components are converted to image data of RGB components.

Numeral 115 denotes RGB (synthesized data of chrominance-related data and luminance-related data) cache data RGBCache. The R, G, and B data outputted from the YCrCb-to-RGB color conversion processing 115 are cached in a memory.

Numeral 116 denotes tone curve adjustment processing, where tone curve adjustment is performed on respective components of R, G, and B employing a user-inputted tone curve adjustment value 117 as a parameter.

Numeral 118 denotes data conversion processing, where the image data having R, G, and B components obtained from the tone curve adjustment processing 116 is converted to data (display data) suitable for displaying the developed result in the developing-procedure operating environment.

Numeral 119 denotes displaying of the display data in display means, such as a display monitor.

Figure 2:
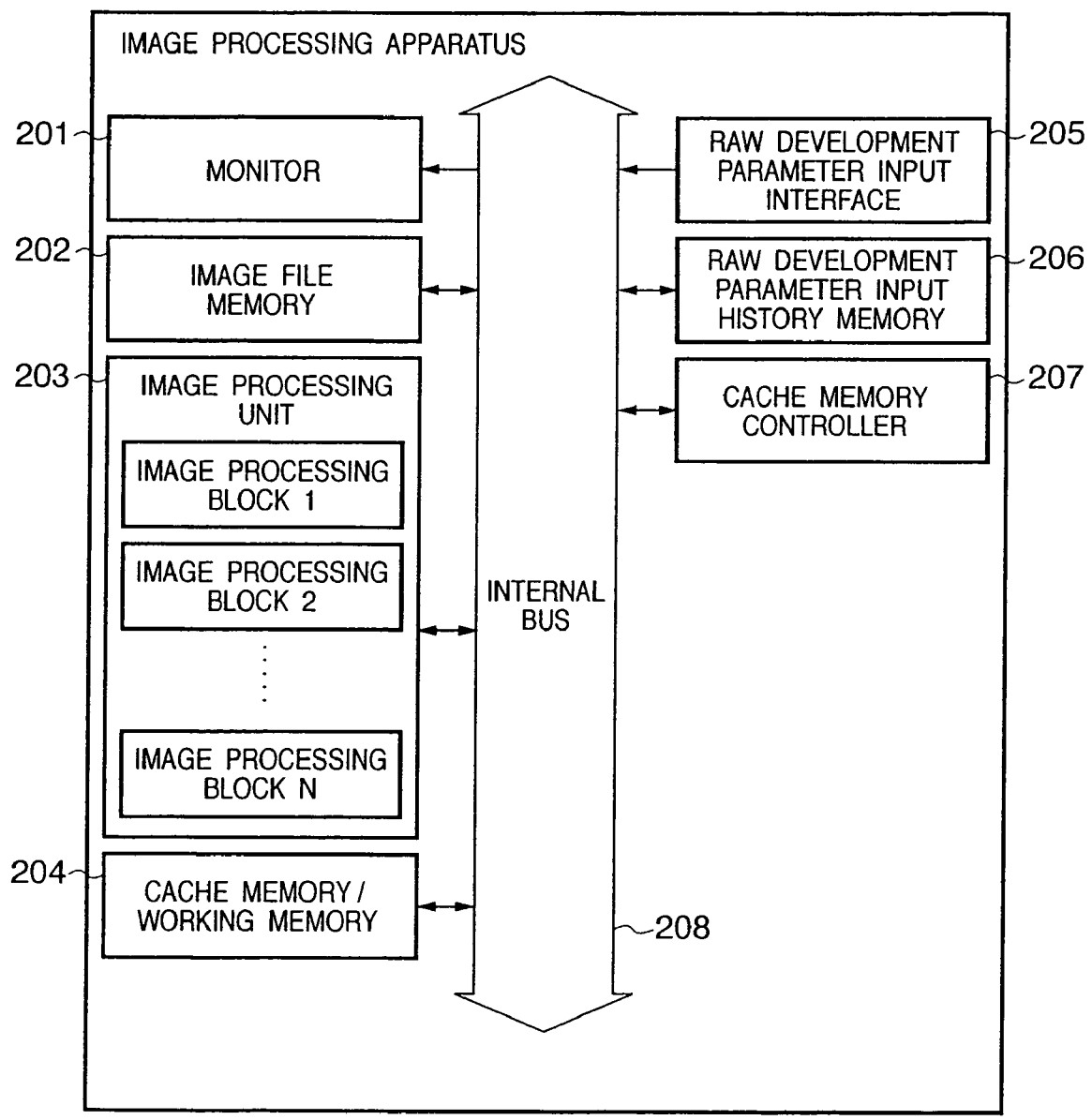
FIG. 2 is a diagram showing an example of a basic construction of the image processing apparatus according to the embodiment of FIG. 1.

FIG. 2 is a diagram showing an example of a basic construction of the image processing apparatus according to the present embodiment, which executes the developing procedure described in FIG. 1.

With respect to numerals 206 and 207, description thereof is omitted since they are not employed in the present embodiment.

Numeral 201 denotes a display monitor serving as display means for displaying an image obtained as a result of developing a raw image, or for displaying a user interface that allows a user to perform raw image development.

Numeral 202 denotes a memory serving as image file storage means for storing raw image data as a file, or storing a raw development result as general-purpose data as necessary.

Numeral 203 denotes an image processing unit serving as image processing means for executing the raw developing procedure described in FIG. 1. More specifically, the image processing unit is a computer such as a CPU. By having the computer execute a control program, the image processing unit functions as plural blocks (image processing blocks 1 to N) that execute plural image processing constituting the aforementioned image processing procedure.

Numeral 204 denotes storage means which serves as a working memory of respective control means (not shown) of the image processing apparatus, or serves as a high-speed memory (cache memory) such as DRAM for storing cache data at the time of executing the raw image development shown in FIG. 1.

Numeral 205 denotes a user interface serving as image processing parameter input means for allowing a user to input a raw development parameter. According to the present embodiment, when a result of raw image development processing shown in FIG. 1 is displayed on the monitor, a user can change the raw development parameters by inputting "color density," "sharpness," "tone curve" or the like in the user interface 205, then development processing is performed again, and the developed result reflecting the adjustment of respective parameters is displayed. In this stage, as will be described later, in a case where results of processing for respective parameters have been cached in the memory 204, part or all of the developing procedure shown in FIG. 1 can be omitted.

For instance, assume that a user changes the adjustment value of "color density" from "1" to "3". In the procedure shown in FIG. 1, the cache data that becomes invalid as a result of this change is only the chrominance-related cache data CrCb2Cache 110 and RGBCache 115 in the subsequent stage. Therefore, the processing up to RGB-to-YCrCb conversion processing 105 need not be performed again, and the CrCbCache 107 and new color density adjustment value 109 are employed to perform chrominance-related processing 108. Further, with respect to luminance-related processing, Y2Cache 113 may be used. As a result, since the number of steps to be executed is reduced as shown below compared to that of the initial development processing shown in FIG. 1, it is possible to obtain a development processing result at higher speed.

That is, in a case where the color density adjustment value 109 is changed, the following processing is performed:

chrominance-related processing 108 using as an input, the CrCbCache 107 and the changed color density adjustment value 109;

YCrCb-to-RGB conversion processing 114 using as an input, the Cr2 and Cb2 outputted from the chrominance-related processing 108, as well as Y2Cache 113;

tone curve adjustment 116; and data conversion 118.

Furthermore, when a user inputs parameters while confirming the development result, if the user wishes to return to the result obtained with previously set parameters, the user can see the result of previous state (the previous set of parameters) at high speed by similarly using the cache data.

As described above, according to the first embodiment, by virtue of caching, step by step, the intermediate processing results obtained during the developing procedure, it is possible to display at high speed the result of development that reflects the changes in various raw development parameters.

Moreover, the raw development parameters that can be changed by a user can be categorized into parameters regarding chrominance-related processing and parameters regarding luminance-related processing. For instance, while "color density" is a parameter regarding chrominance-related processing, "sharpness" is a parameter regarding luminance-related processing. By virtue of caching the intermediate results of respective steps of the chrominance-related processing and the luminance-related processing, in a case where a raw development parameter is changed, depending on whether the parameter is regarding the luminance-related processing or the chrominance-related processing, it is possible to use the most appropriate cache data that minimizes the processing steps or processing time. Therefore, higher speed of the development processing can be realized.

Second Embodiment

In the above-described development processing utilizing a cache system as described in the first embodiment with reference to FIG. 1, the intermediate results obtained during the image processing procedure are stored in a high-speed memory such as DRAM in many occasions in accordance with the nature of the raw development parameters such as chrominance-related processing or luminance-related processing. By virtue of this, it is possible to perform development processing at high speed in a case where various changes are made in adjustment values (raw development parameters). On the other hand, it requires a memory for storing a large amount of intermediate results. Assuming a case where image data of an image has a size of 4000 horizontal pixels×3000 vertical pixels, if data having 16 bits/pixel (2 bytes/pixel) is cached in the development processing shown in FIG. 1, the cache memory would require a large capacity, i.e., 240 MB as in the following:

\*data for 1 plane=4000×3000×2 (byte)=24 MB

YCache . . . 1 plane for luminance data Y=24 MB×1=24 MB

CrCbCache . . . 2 planes for chrominance data CrCb=24 MB×2=48 MB

Y2Cache . . . 1 plane for luminance data Y=48 MB×1=48 MB

CrCb2Cache . . . 2 planes for chrominance data CrCb=24 MB×2=48 MB

RGBCache . . . 3 planes for RGB=24 MB×3=72 MB

Total cache data=72 MB+24 MB+48 MB+48 MB+48 MB=240 MB

In view of the above, described in the second embodiment is image processing performed during raw development processing, which achieves a high cache hit rate and high-speed development processing when one set of raw data is subjected to development processing plural numbers of times with different development parameters, and which requires a small amount of cache memory and does not impose a large load on a system.

In the image processing apparatus according to the present embodiment having the construction shown in FIG. 2, the cache memory controller 207 serving as cache control means determines cache data to be stored as intermediate data in the image processing by referring to the raw development parameter input history memory 206 serving as raw development parameter input history means. Accordingly, it is possible to store a minimum amount of cache data necessary, and realize a cache system having a high hit rate without using a large amount of cache memory.

Since the basic construction of FIG. 2 is identical to that of the first embodiment, only the different points are described.

The image processing parameter input history memory 206 stores raw development parameters, which have been used at least in the previous raw development processing, in a form such as that shown in FIG. 11, for allowing a comparison between the current raw development parameters and the stored parameters. (The input history of raw development parameters may include not only the previous parameters, but also parameters in the past several times. This achieves a higher cache hit rate.)

The cache memory controller 207 controls whether to store the respective cache data shown in FIG. 1 in the cache memory 204 or to discard the cache data.

Numeral 208 denotes an internal bus for data transmission and reception among respective units of the image processing apparatus.

Figure 3:
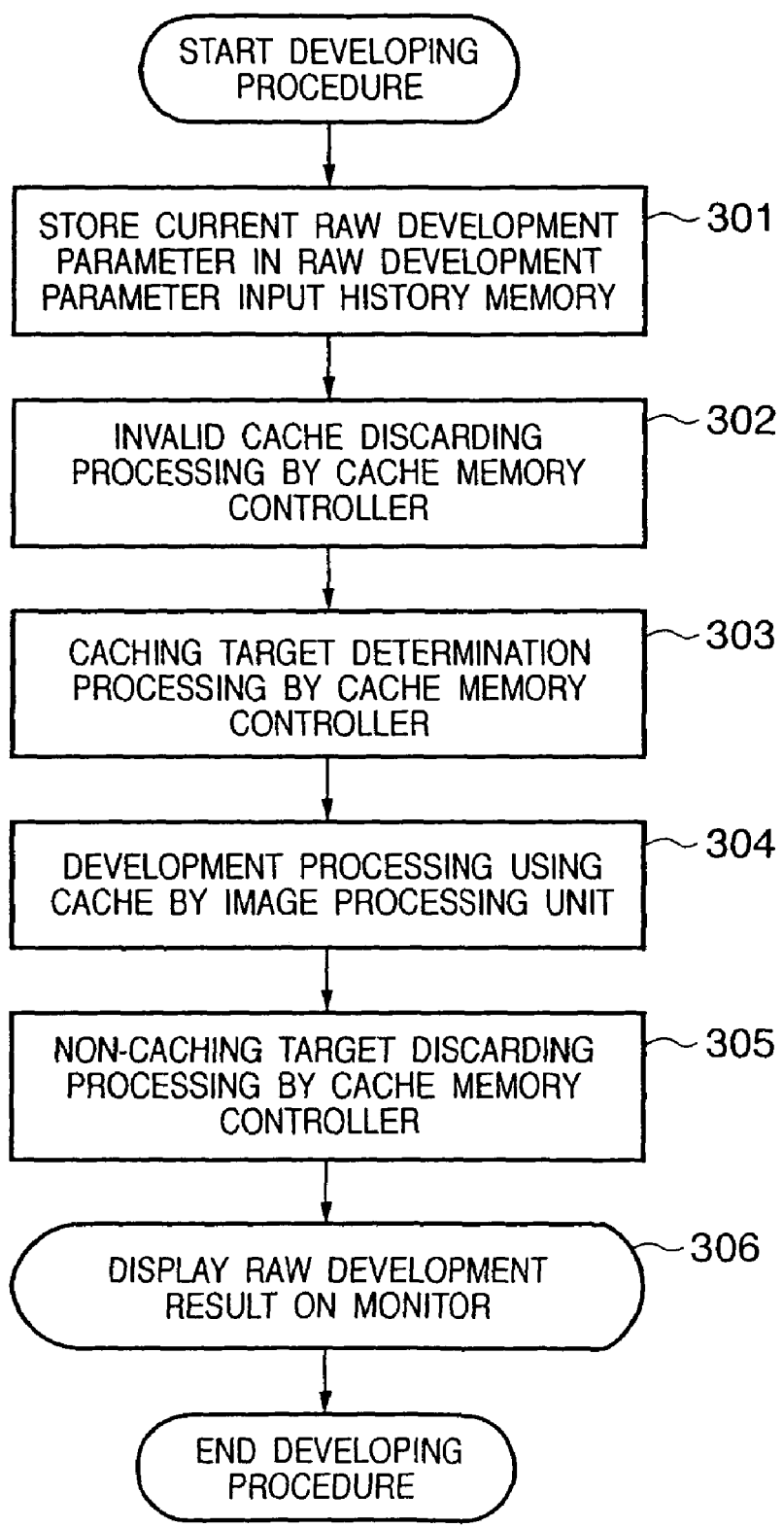
FIG. 3 is a flowchart describing a developing procedure according to a second embodiment of the present invention.

A developing procedure according to the second embodiment is described further in detail with reference to FIG. 3.

When a raw image is to be displayed initially on the display monitor 201 with development parameters of a default condition or a condition set at the time of image sensing, or when a user changes the raw development parameters using the raw development parameter input means 205 and the image on the display monitor is to be updated, the image processing apparatus according to the present embodiment performs the developing procedure shown in the flowchart in FIG. 3.

In step 301, all the current raw development parameters are stored in the raw development parameter input history memory 206.

In step 302, the cache memory controller 207 discards cache data to be invalidated among the cache data stored in the cache memory 204. The procedure of discarding the cache data to be invalidated will be described later in detail with reference to FIG. 8 (invalid cache discarding processing). The cache data to be invalidated is all the cache data stored in the subsequent stages of the processing which should be executed again with an altered adjustment value in response to alteration of the raw development parameters. Therefore, the cache memory controller 207 determines whether or not the adjustment value has been changed by referring to the raw development parameter input history memory 206, and discards all the cache data stored in the subsequent stages of the processing executed with the altered adjustment value.

In step 303, the cache memory controller 207 determines data to be cached among the data outputted as an intermediate result of the current development processing. The determination method will be described later with reference to FIG. 9 (caching target determination processing).

When a user inputs a raw development parameter while confirming the raw development result in the monitor 201, it is often the case that the user changes the adjustment value of the same adjustment item. For instance, in a case where the "color density" having adjustment values of 1 to 10 is adjusted as an adjustment item of the raw development parameters, assume that a slider that allows setting of values 1 to 10 is used as a user interface. In this case, it is often the case that a user continually moves the slider while confirming the displayed image of the raw development result and decides the most preferable adjustment value by trial and error. Particularly in this case, the important point for improving usability is to hit the most appropriate cache data and to display the raw development result on a display device at high speed.

In view of the foregoing characteristic of raw image development, the cache memory controller 207 according to the present invention refers to the raw development parameter input history memory 206 to determine which raw development parameter has been changed, by comparison between the previous and current development processing. Then, the cache memory controller 207 decides data to be cached, predicting that the changed adjustment item will again be changed in the next development processing.

For instance, in a case where the adjustment item "color density" is changed in the development processing in FIG. 1, it is predicted that "color density" adjustment is highly likely to be repeated in the next development processing. For this reason, even in a case where the "color density" is changed, cache data which will be valid and necessary in the next development processing is decided (identified) as data to be cached preferentially. Therefore, in the raw developing procedure shown in FIG. 1, the CrCbCache 107, which is stored immediately before the "color density" is changed (updated), and the Y2Cache 113 that has been subjected to luminance-related processing are both decided as data to be cached preferentially.

Furthermore, in the present embodiment, while cache data which will be valid and necessary in the next development processing is stored preferentially, data which will highly likely be invalid or not used in the next development processing is not cached.

For instance, assuming that the "color density" is changed, the cache data CrCb2Cache 110 is not cached (is considered "invalid") because the change in the color density adjustment value calls for re-execution of the chrominance-related processing 108 and updating of the data Cr2 and Cb2. Moreover, the Ycache 106 and Y2Cache 113 are decided not to be cached, as they will highly likely be invalid or not used in the next development processing. The reason is that the Ycache 106 is cache data stored as a result of the RGB-to-YCrCb conversion 105 which is positioned in the previous stage of the chrominance-related processing 108. In addition, the cache data Y2Cache 113, which has been subjected to luminance-related processing that is not simultaneously performed with chrominance-related processing 108 for changing the "color density", is preferentially stored. Therefore, even if the "color density" is changed, updating of these data is not necessary and these data will not be used.

Furthermore, the RGBCache 115 is cache data stored after the output results of chrominance-related processing and luminance-related processing are synthesized and subjected to YCrCb-to-RGB color conversion. Since the RGBCache 115 is updated according to the change in the "color density", there is no point in caching the data. Therefore, it is decided that the RGBCache 115 is not to be cached.

In step 304, the image processing unit 203 performs raw image development processing. If there is valid cache data in this stage, development processing is performed using the valid cache data. The processing performed prior to the valid cache data is not performed since the cache data includes the results. Therefore, when a cache hit is found, higher speed is achieved in the raw development processing. With respect to the intermediate result of each processing performed, the cache memory controller 207 determines caching target, and the target data is stored in the cache memory 204.

In step 305, if there is cache data (non-caching target) that has been decided not to be cached by the cache memory controller 207, that data is discarded.

In step 306, the result obtained by the development processing in step 304 is displayed on the monitor 201. Then, the developing procedure performed by the image processing apparatus according to the present embodiment ends.

As described above, according to the image processing apparatus of the present embodiment, in a case where one raw image adjustment value is changed plural numbers of times, efficient cache data hit can be realized, high-speed raw development processing can be performed, and the processing result can be displayed at high-speed with small memory consumption. Therefore, it is possible to provide preferable usability in the raw image development operation performed by a user by trial and error.

Figure 4:
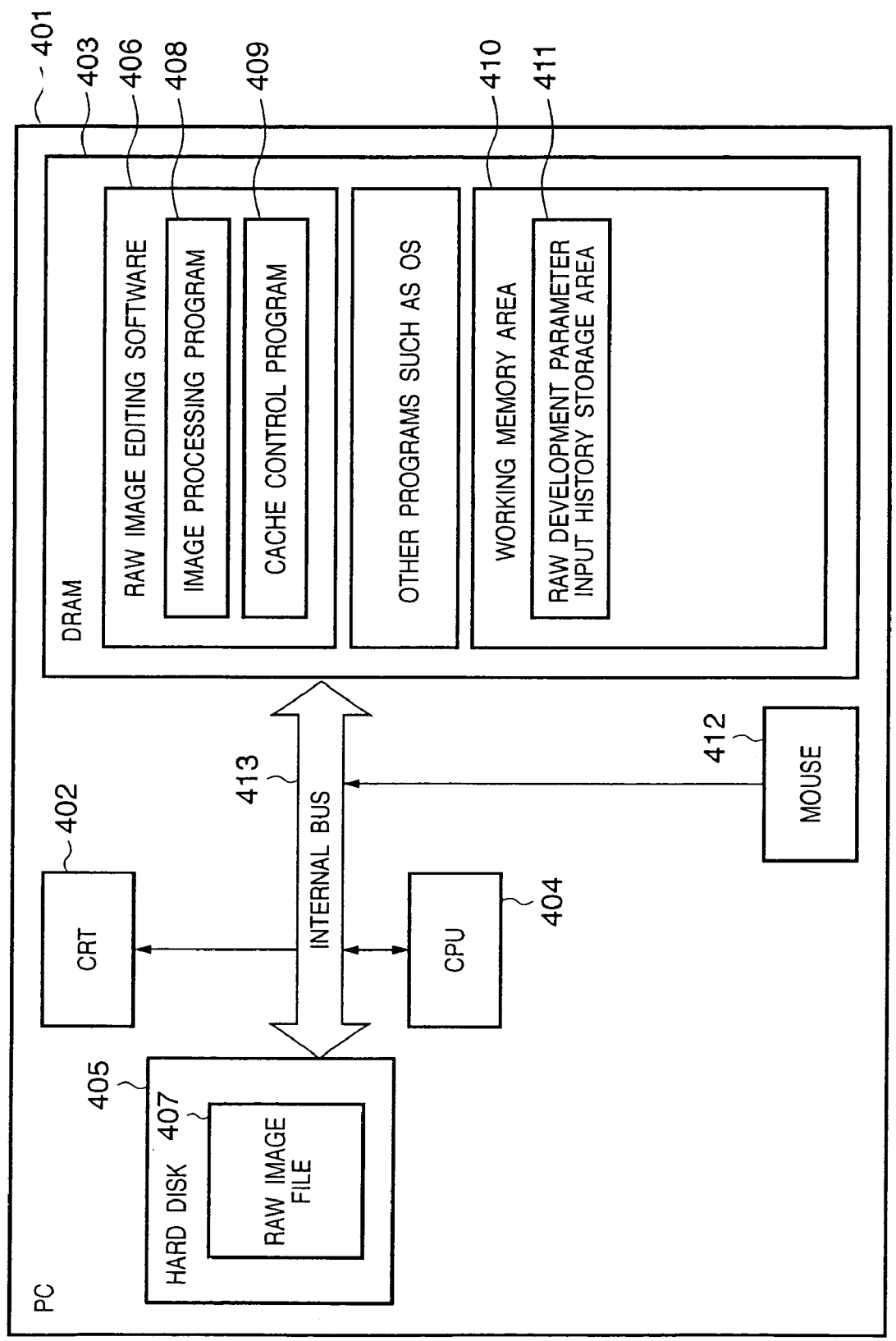
FIG. 4 is a diagram showing an example of a basic construction of an image processing apparatus according to the present invention in a case where the apparatus is realized by a personal computer.

FIG. 4 is a diagram showing a construction and a data arrangement in a case where a personal computer (PC) 401, which is in common use, is employed as the image processing apparatus realizing the second embodiment.

The PC according to this embodiment, which is similar to the one commonly used nowadays, comprises an OS program, ROM, a keyboard, a mouse, a power source unit, a hardware control program and the like, which are not shown in the drawing.

Numeral 402 denotes a CRT display, serving as an example of the monitor 201 that displays image data and operation members for editing the image data.

Numeral 403 denotes DRAM storing various programs and data. As similar to a PC that is in common use, an OS program, a driver program, and an application program which are not shown in the drawing are read into the DRAM and executed by a CPU 404.

Numeral 405 denotes a hard disk serving as a non-volatile storage medium. The hard disk is similar to the one comprised in a PC that is in common use.

Numeral 406 denotes a raw image editing program, which is capable of reading a RAW image file 407 from the hard disk 405, performing development by an image processing program 408 in accordance with raw development parameters, and displaying the result on the CRT 402.

The raw image editing program 406 is an application program which is installed in advance in the hard disk 405 as similar to programs in a PC commonly used. Upon the user's start-up operation, the program and related data are read into the DRAM 403 and processing is performed by the CPU 404.

The image processing program 408 is provided for performing development processing (image processing) of raw image data. The program 408 together with the CPU 404 realizes the image processing unit 203 shown in FIG. 2.

A cache control program 409 controls caching of intermediate processing result data of the raw image development.

The program 409 together with the CPU 404 realizes the cache memory controller 207 shown in FIG. 2.

Numeral 410 denotes a working memory area corresponding to the cache memory 204 shown in FIG. 2, which is used as a working memory by the raw image editing program 406 or other programs (not shown).

Numeral 411 denotes a raw development parameter input history storage area, serving as the raw development parameter input history memory 206, which is used as an area storing a history of raw development parameters inputted by a user. In this embodiment, assume that only the previous input values and current input values are stored.

Numeral 412 denotes a mouse similar to the one comprised in a PC commonly used. The mouse 412 is an example of the raw development parameter input interface 205 shown in FIG. 2.

Numeral 413 denotes an internal bus for data transmission and reception among the blocks shown in FIG. 4.

Assume that the raw image editing program 406 in FIG. 4 displays a user interface shown in FIG. 5 on the CRT 402 at the time of apparatus startup.

In FIG. 5, numeral 501 denotes a main window displayed by the raw image editing program. Displayed in the window is a raw image development processing result 502. Numeral 503 denotes a raw development parameter editing dialogue for changing the raw development parameters. The dialogue 503 includes adjustment controller for white balance 504, color density (saturation) 505, sharpness 506, and tone curve 507.

In the state shown in FIG. 5, the color density is set in "7", the sharpness is set in "3", and the tone curve is set as shown in the graph. Numeral 502 shows the result of development processing performed based on these raw development parameters. If an adjustment value is changed, raw development is immediately performed and the result of the change in adjustment value is displayed as the image 502.

If, for instance, a user moves the slider of the "color density" adjustment value from "7" to "3", the slider goes through the values "6", "5", and "4" along the way. At each of these values, development processing is performed and the image 502 is updated. In other words, raw development processing and display image updating are performed four times. In this case, since consecutive raw development processing is performed four times with respect to one adjustment item "color density," the cache system according to the present invention operates effectively.

Figure 6:
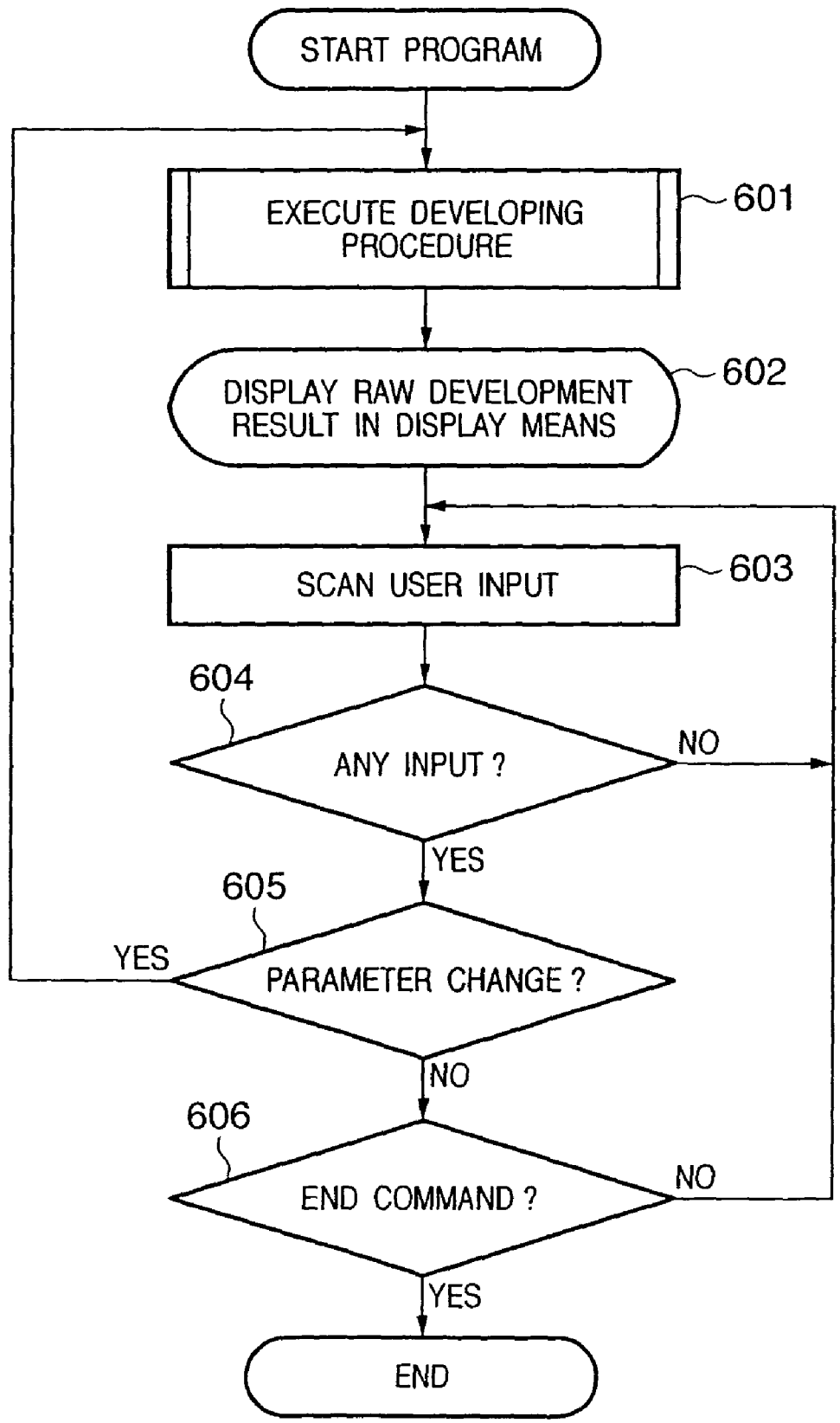
FIG. 6 is a flowchart describing an operating procedure of a raw image editing program shown in FIG. 4.

FIG. 6 is a flowchart describing a raw developing procedure in the image processing apparatus according to the present embodiment. The raw developing procedure according to the present embodiment is realized by the CPU 404 executing the raw image editing program 406 and the cache control program 409.

When the raw image editing program 406 is started upon user's operation on the PC, in step 601, the raw image data file 407 is read from the hard disk 405 by the CPU 404 through the bus, and the developing procedure is executed.

In step 602, the developed result of the raw image obtained as a result of executing the developing procedure is displayed on the CRT 402.

In step 603, it is scanned whether or not a user has inputted at least one of the raw development parameters from the mouse 412.

If there is no user input, the determination in step 604 results in NO, and user input scanning is performed again in step 603.

If there is a user input, the determination in step 604 results in YES, and the control proceeds to step 605.

In step 605, it is determined whether or not the content of the user input is an operation to change the raw development parameters.

In a case where a raw development parameter is changed, the determination in step 605 results in YES, and the control returns to the developing procedure in step 601 since it is necessary to display a result of raw development processing that reflects the change in the raw development parameters.

In a case where the user input is not an operation to change the raw development parameters, the determination in step 605 results in NO, and the control proceeds to step 606.

In step 606, it is determined whether or not a user input is an end request command. If it is a command other than an end request, the control returns to step 603 to scan a user input.

If the user input is an end request command, the determination in step 606 results in YES. Upon performing necessary end processing such as discarding a secured memory, the raw image editing program ends.

Next, the content of the developing procedure in step 601 is described in detail with reference to FIG. 7.

Note that the development processing according to the present embodiment is similar to the basic procedure shown in FIG. 1.

Upon startup of the developing procedure, in step 701, the current raw development parameters are stored in the raw development parameter input history storage area 411.

In step 702, the cache control program 409 refers to the raw development parameter input history storage area 411 to compare the current raw development parameters with the raw development parameters used in the previous development processing. If there is cache data to be invalidated in the working memory area 410, it is discarded. By discarding invalid cache data as early in the process as possible, it is more likely to be able to secure necessary working memory in the subsequent stages. Therefore, it is preferable to discard invalid data in step 702.

In step 703, among the intermediate data obtained as a result of current development processing, the cache control program 409 determines intermediate data to be kept as cache data even after the end of this developing procedure. Herein, the intermediate data to be cached will be referred to as the caching target.

In step 704, the image processing program 408 executes raw development processing while referring to the valid cache data, generates a raw image development result which reflects the current raw development parameters, and stores the result in the working memory area 410.

Figure 7:
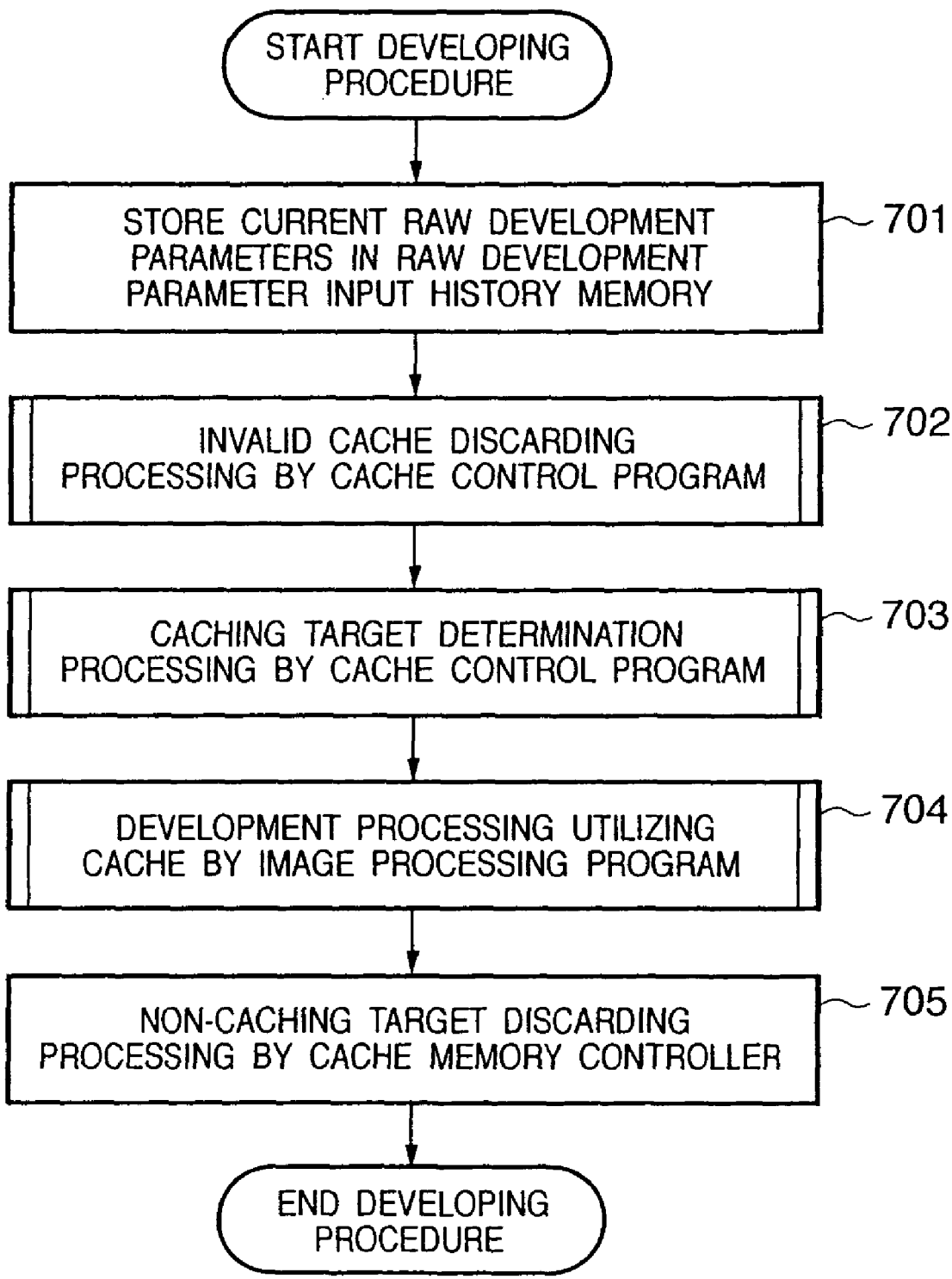
FIG. 7 is a flowchart describing in detail a developing procedure shown in FIG. 6.

In step 705, the cache control program 409 discards intermediate data other than the caching target data, if there is any left in the working memory area 410, and ends the developing procedure according to the present embodiment shown in FIG. 7.

Figure 8:
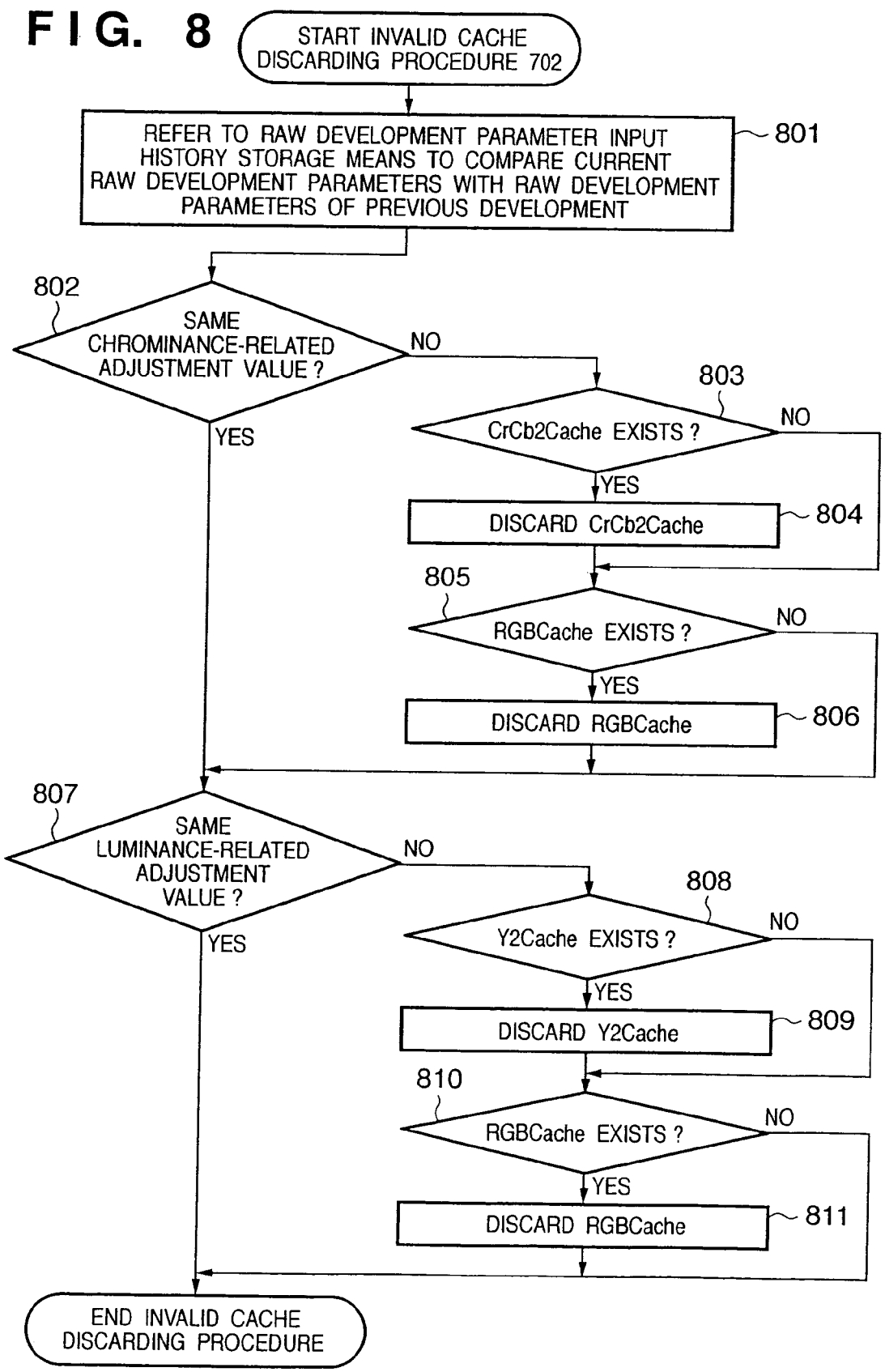
FIG. 8 is a flowchart describing in detail an invalid cache discarding procedure shown in FIG. 7.

Next, the invalid cache discarding step 702 executed by the cache control program 409 is described in detail with reference to FIG. 8.

In the invalid cache discarding processing, first in step 801, the raw development parameter input history storage area 411, having for instance a form shown in FIG. 11, is referred to compare the current raw development parameters with the raw development parameters used in the previous development processing.

If the level value of the chrominance-related adjustment value (color density) is different from the one used in the previous development processing, the determination in step 802 results in NO, and the control proceeds to step 803. If the value is the same, the control proceeds to step 807 using CrCb2Cache and RGBCache.

If CrCb2Cache exists in step 803, it is discarded from the working memory area in step 804 as invalid cache data, since it will be changed by a different adjustment value.

If RGBCache exists in step 805, it is also discarded from the working memory area 410 in step 806 as invalid cache data.

More specifically, in the procedure shown in FIG. 1, CrCb2Cache 110 and RGBCache 115 are intermediate data that are directly or indirectly influenced by the result of chrominance-related processing 108. If values of the development parameters regarding chrominance-related processing (chrominance-related adjustment values) have been changed, these cache data in the memory become invalid. Therefore, it is necessary to discard the data as in steps 804 and 806.

If the chrominance-related adjustment values (color density) are the same as the previous values, the determination in step 802 results in YES, and the control proceeds to step 807.

In step 807, it is determined whether or not values of the development parameters regarding luminance-related processing (luminance-related adjustment values such as sharpness, gamma correction, and noise removal) have been changed.

If the luminance-related adjustment values have been changed, the determination in step 807 results in NO, and the control proceeds to step 808.

If Y2Cache 113 exists in step 808, it is discarded from the working memory area 410 in step 808 as invalid cache data.

If RGBCache 115 exists in step 810, it is discarded from the working memory area 410 in step 811 as invalid cache data. Then, the invalid cache discarding processing ends.

More specifically, in the procedure shown in FIG. 1, RGBCache 115 is intermediate data that is formed based on the result of luminance-related processing 111 and is directly influenced by this result. If the luminance-related adjustment values have been changed, the cache data becomes invalid. Therefore, it is necessary to discard the data not only in step 806 but also in step 811.

Meanwhile, in the determination in step 807, if the luminance-related adjustment values (e.g., sharpness) are the same as the previous values, the determination in step 807 results in NO, and the invalid cache discarding processing ends.

Note that, although not included in the flowchart, in a case where the white balance adjustment value 104 is changed, the intermediate data obtained after white balance adjustment is directly or indirectly used by all the luminance-related and chrominance-related processing in the subsequent stages. Therefore, all the cache data (YCache, CrCbCache, Y2Cache, CrCb2Cache, RGBCache) existing after the white balance adjustment processing 103 are discarded.

Figure 9:
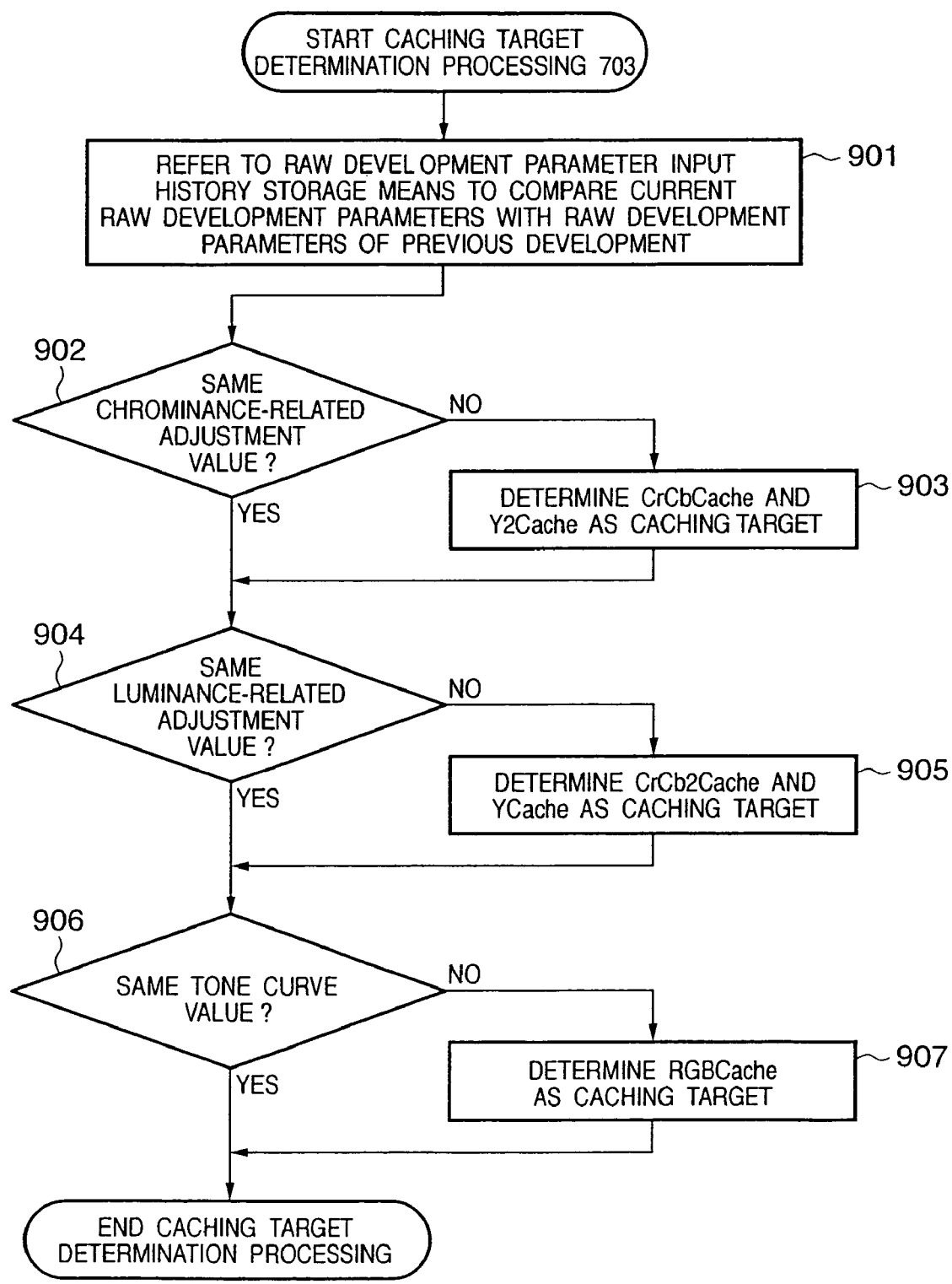
FIG. 9 is a flowchart describing in detail a caching target determining procedure shown in FIG. 7.

Next, the caching target determining step 703 executed by the cache control program 409 is described in detail with reference to FIG. 9.

In step 901, the raw development parameter input history storage area 411 is referred to compare the current raw development parameters with the raw development parameters used in the previous development processing. (At the time of initial development, assume that previous adjustment values=current adjustment values)

In step 902, it is determined whether or not the chrominance-related adjustment values (color density) have been changed from the previous time. If the values have been changed, the determination results in NO, and the control proceeds to step 903.

In step 903, CrCbCache 107 and Y2Cache 113 are determined as the caching target. As is apparent from FIG. 1, the next time the chrominance-related adjustment values are changed, it is possible to obtain a development result with a smallest number of steps by virtue of the existence of two bodies of cache data CrCbCache 107 and Y2Cache 113.

If the determination in step 902 results in YES, step 903 is skipped and the control proceeds to step 904.

In step 904, it is determined whether or not the luminance-related adjustment values (e.g., sharpness) have been changed from the previous time. If the values have been changed, the determination results in NO, and the control proceeds to step 905.

In step 905, CrCb2Cache 110 and YCache 106 are determined as the caching target. As is apparent from the flowchart in FIG. 1, the next time the adjustment values of luminance-related processing are changed, it is possible to obtain a development result with a smallest number of steps by virtue of the existence of two bodies of cache data CrCb2Cache 110 and YCache 106.

If the determination in step 904 results in YES, step 905 is skipped and the control proceeds to step 906.

In step 906, it is determined whether or not the tone curve adjustment value 117 has been changed from the previous time. If the value has been changed, the determination results in NO, and the control proceeds to step 907.

In step 907, RGBCache 115 is determined as the caching target. As is apparent from the flowchart in FIG. 1, the next time the tone curve adjustment value 117 is changed, it is possible to obtain a development result with a smallest number of steps by virtue of the existence of cache data RGBCache 115.

If the determination in step 906 results in YES, step 907 is skipped and the caching target determination processing ends.

Next, the development processing step 704 utilizing a cache, which is executed by the image processing program 408, is described in detail with reference to FIG. 10.

In step 1001, it is determined whether or not the RGBCache 115 exists in the cache memory. If it exists, the cache data RGBCache 115 can be adopted as the processing result obtained up to the tone curve adjustment 116. In other words, when the determination in step 1001 results in YES, then in step 1009, the tone curve adjustment 116 utilizing the inputted tone curve adjustment value 117 and the data conversion 118 are performed, and the results are stored in the working memory area 410. Then, the procedure ends.

Meanwhile, if the RGBCache 115 does not exist, the determination in step 1001 results in NO, and the control proceeds to step 1002.

In step 1002, it is determined whether or not the Y2Cache 113 exists in the cache memory. If it exists, the determination results in YES, and the control proceeds to step 1006. If it does not exist, the determination results in NO, and the control proceeds to step 1003.

In step 1003, it is determined whether or not the YCache 106 exists in the cache memory. If it exists, the control proceeds to step 1005. If it does not exist, the control proceeds to step 1004.

In step 1004, interpolation processing 102, WB adjustment processing 103, and RGB-to-YCrCb color space conversion processing 105 are executed. If the YCache 106 and CrCbCache 107 obtained as the processing result are the caching target determined in the aforementioned caching target determination processing, the processing result is cached.

Note that even if the processing result is not the caching target, it does not mean that the result is immediately discarded here. In the present embodiment, it is necessary to maintain YCache until Y2Cache or data in the subsequent stage is obtained. Also, it is necessary to maintain CrCbCache until Cr2 and Cb2 or data in the subsequent stages are obtained. In other words, even if the data is a non-caching target, it may be referred to by other processing in the latter stage of the development processing. As long as such data is necessary to complete the current development processing, it is necessary to store the data as temporary data. Determination as to the storage period is a design matter that should be decided appropriately in accordance with the content of development processing. Therefore, the description thereof is omitted herein.

In step 1005, the luminance-related processing 111 such as APC, gamma correction, and noise removal is performed. If the Y2Cache 113 is determined as the caching target in the aforementioned caching target determination processing, the result of processing 111 is cached.

In step 1006, it is determined whether or not the CrCb2Cache 110 exists in the cache memory. If CrCb2Cache 110 exists in the cache memory, the determination in step 1006 results in YES, and the control proceeds to step 1008. If CrCb2Cache 110 does not exist, the determination in step 1006 results in NO, and the control proceeds to step 1007.

In step 1007, chrominance-related processing 108, such as color density adjustment, is performed. If the CrCb2Cache 110 is determined as the caching target in the aforementioned caching target determination processing, the result of processing 108 is cached.

In step 1008, YCrCb-to-RGB color space conversion processing 114 is performed. If the RGBCache 115 is determined as the caching target in the aforementioned caching target determination processing, the result of processing 114 is cached.

Then, the above-described processing in step 1009 is performed. Thereafter, the developing procedure utilizing a cache, which is executed by the image processing program 408, ends.

Note, although the present embodiment performs development processing in order of luminance-related processing and chrominance-related processing, the sequence is not limited to this. The processing sequence may be in any order to realize the procedure in FIG. 1.

Figure 10:
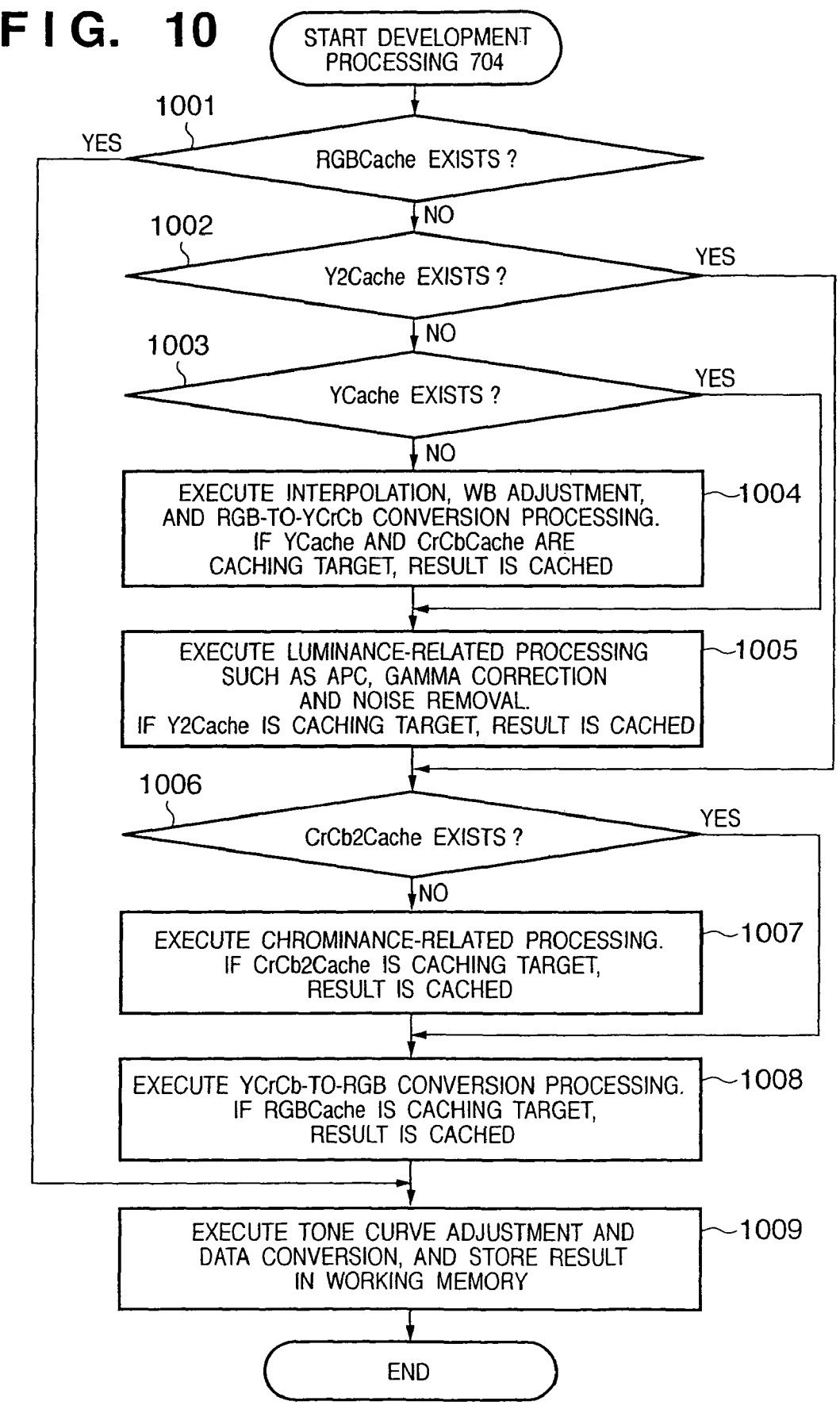
FIG. 10 is a flowchart describing in detail a developing procedure utilizing a cache, shown in FIG. 7.

Hereinafter, the effectiveness of the cache system in the procedure shown in FIG. 10 is described.

For instance, assume that the respective processing time is as follows:

interpolation processing . . . 200 (msec)
WB adjustment . . . 100 (msec)
RGB-to-YCrCb conversion processing . . . 50 (msec)
chrominance-related processing . . . 300 (msec)
luminance-related processing . . . 500 (msec)
YCrCb-to-RGB conversion processing . . . 50 (msec)
tone curve adjustment . . . 100 (msec)
data conversion . . . 50 (msec)

As a result, the time consumed in initial development is as follows:

initial development time . . . 200+100+50+300+500+50+100+50=1350 (msec)

When the tone curve is changed for the first time, since all the cache data becomes invalid, the development processing takes the same time (1350 msec) as the initial development time. However, this processing time is required only in the beginning of the tone curve adjustment operation. As the user continues tone curve adjustment operation on the slide bar, the RGBCache becomes valid, and later the development processing time during tone curve operation is reduced as follows:

development time during tone curve operation . . . 100+50=150 (msec)

Therefore, the user is able to confirm the adjustment result almost in real time while adjusting the tone curve.

Furthermore, in a case of caching 16-bit data having 4000 horizontal pixels×3000 vertical pixels, the necessary memory capacity is as follows:

RGBCache . . . 3 planes for RGB=24 MB×3=72 MB

Therefore, the memory capacity of a commonly used PC is sufficient.

In the similar manner, in a case of adjusting parameters other than the tone curve, e.g., color density or sharpness, the similar effect to the above-described effect can be achieved.

As described above, the second embodiment provides an image processing apparatus capable of performing raw development processing at high speed with pleasant response, which does not require a large-capacity working memory so as to enable a reduced calculation load on the PC.

Other Embodiment

In the foregoing embodiments, a raw image is described as image data that has been subjected to photoelectric conversion by an image sensor and subjected to A/D conversion at the time of image sensing by a digital camera, but has been subjected to no image processing at the time of storing. However, a raw image may be of, e.g., an outputted analog signal from an image sensor, an A/D converted image signal which has not been subjected to at least white balance processing, or an A/D converted image signal from an image sensor which has not been subjected to color separation for separating a luminance signal from a color signal or which has not been subjected to color interpolation, as long as it holds an output signal from the image sensor with minimum data loss.

The present invention may be configured to perform development processing in a digital camera by reading a raw image sensed by the digital camera from a recording medium and inputting development parameters in the digital camera, or may be configured to input development parameters with remote operation from outside a digital camera, e.g., a PC, by physically or electrically connecting the digital camera with a device, e.g., a PC or a printer.

Further, the object of the present invention can also be achieved by providing a storage medium, storing program codes of software realizing the above-described functions of the embodiments, to a computer system or apparatus, reading the program codes, by a computer (CPU or MPU) of the computer system or apparatus, from the storage medium, then executing the program. In this case, the program codes read from the storage medium realize the functions according to the embodiments, and the storage medium storing the program codes constitutes the invention.

Furthermore, a system or an apparatus executing the above-described functions of the embodiments is not limited to a PC, but may be an image sensing apparatus, such as a digital camera. In this case, the processing from development parameter input to image display is completed by the image sensing apparatus alone.

The storage medium, such as a flexible disk, a hard disk, an optical disk, a magneto-optical disk, CD-ROM, CD-R, a magnetic tape, a non-volatile type memory card, and ROM can be used for providing the program codes.

Meanwhile, besides aforesaid functions according to the above embodiments are realized by executing the program codes which are read by a computer, the present invention includes a case where an OS (operating system) or the like working on the computer performs part or the entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs part or the entire processes in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-131572, filed on Apr. 27, 2004, which is hereby incorporated by reference herein.

What is claimed is:

1. An image processing apparatus comprising:
input means for inputting original image data, which is obtained by digitalizing an image signal that has been converted from light from an object to an electric signal by an image sensor, and performing no compression or lossless compression;
image processing parameter input means for inputting a first luminance parameter and a first chrominance parameter in accordance with an operation by a user;
image processing means for performing, as the image processing, a conversion processing in which the original image data input by said input means is converted to an original luminance signal and an original chrominance signal, a luminance adjustment processing in which the original luminance signal is adjusted in accordance with the first luminance parameter and a chrominance adjustment processing in which the original chrominance signal is adjusted in accordance with the first chrominance parameter;
storage means for storing the original luminance signal of the original image data, the original chrominance signal of the original image data, the adjusted luminance signal of the original image data, and the adjusted chrominance signal of the original image data individually, as a plurality of intermediate results of the image processing by said image processing means;
first reuse control means for, when said image processing parameter input means inputs a second luminance parameter different from the first luminance parameter but does not input a second chrominance parameter different from the first chrominance parameter, controlling to generate a new processed image data of the original image data by causing said image processing means to perform the luminance adjustment processing to the original luminance signal stored in the storage means in accordance with the second luminance parameter and using the adjusted chrominance signal stored in the storage means; and
second reuse control means for, when said image processing parameter input means inputs a second chrominance parameter different from the first chrominance parameter but does not input a second luminance parameter different from the first luminance parameter, controlling to generate a new processed image data of the original image data by causing said image processing means to perform the chrominance adjustment processing to the original chrominance signal stored in the storage means in accordance with the second chrominance parameter and using the adjusted luminance signal stored in the storage means.

2. The image processing apparatus according to claim 1, further comprising:
image processing parameter input history storage means for storing input history information of luminance and chrominance parameters input by said image processing parameter input means; and
storage control means for controlling whether or not to store the adjusted luminance signal and the adjusted chrominance signal in said storage means in accordance with a comparison between current image processing parameters and previous input history information stored in said image processing parameter input history storage means.

3. The image processing apparatus according to claim 1, wherein the conversion processing is a color space conversion processing.

4. The image processing apparatus according to claim 1, wherein the luminance adjustment processing is a sharpness level adjust processing.

5. The image processing apparatus according to claim 1, wherein the chrominance adjustment processing is a color depth adjust processing.

6. An image processing method comprising:
using a processor to perform:
an input step of inputting original image data, which is obtained by digitalizing an image signal that has been converted from light from an object to an electric signal by an image sensor, and performing no compression or lossless compression;
an image processing parameter input step of inputting a first luminance parameter and a first chrominance parameter in accordance with an operation by a user;
an image processing step of performing, as the image processing, a conversion processing in which the original image data input in said input step is converted to an original luminance signal and an original chrominance signal, a luminance adjustment processing in which the original luminance signal is adjusted in accordance with the first luminance parameter and a chrominance adjustment processing in which the original chrominance signal adjusted in accordance with the first chrominance parameter,
a storage step of storing the original luminance signal of the original image data, the original chrominance signal of the original image data, the adjusted luminance signal of the original image data, and the adjusted chrominance signal of the original image data individually, as a plurality of intermediate results of the image processing in said image processing step;
a first reuse control step of, when in said image processing parameter input step a second luminance parameter, which is different from the first luminance parameter, is input but a second chrominance parameter, which is different from the first chrominance parameter, is not input, controlling to generate a new processed image data of the original image data by causing the luminance adjustment processing to be performed to the original luminance signal stored in the storage step in accordance with the second luminance parameter and using the adjusted chrominance signal stored in the storage step; and a second reuse control step for, when in said image processing parameter input step a second chrominance parameter, which is different from the first chrominance parameter, is input but a second luminance parameter, which is different from the first luminance parameter, is not input, controlling to generate a new processed image data of the original image data by causing the chrominance adjustment processing to be performed to the original chrominance signal stored in the storage step in accordance with the second chrominance parameter and using the adjusted luminance signal stored in the storage step.

7. The image processing method according to claim 6, wherein the processor further performs:

an image processing parameter input history storage step of storing input history information of luminance and chrominance parameters input in said image processing parameter input step; and a storage control step of controlling whether or not to store the adjusted luminance signal and the adjusted chrominance signal in accordance with a comparison between current image processing parameters and previous input history information stored in said image processing parameter input history storage step.

8. A non-transitory computer-readable storage medium storing a computer control program for causing a computer to realize the image processing method described in claims 6.

* * * * *